July 14, 1925.

A. H. HOPPOCK

WATER COOLED ANODE FOR VACUUM TUBES

Filed Nov. 20, 1920

1,545,654

Inventor:
Allen H. Hoppock
by W. E. Beatty,
Atty.

Patented July 14, 1925.

1,545,654

UNITED STATES PATENT OFFICE.

ALLEN H. HOPPOCK, OF WESTFIELD, NEW JERSEY, ASSIGNOR TO WESTERN ELECTRIC COMPANY, INCORPORATED, OF NEW YORK, N. Y., A CORPORATION OF NEW YORK.

WATER COOLED ANODE FOR VACUUM TUBES.

Application filed November 20, 1920. Serial No. 425,348.

*To all whom it may concern:*

Be it known that I, ALLEN H. HOPPOCK, a citizen of the United States, residing at Westfield, in the county of Union, State of New Jersey, have invented certain new and useful Improvements in Water-Cooled Anodes for Vacuum Tubes, of which the following is a full, clear, concise, and exact description.

This invention relates to vacuum tubes and pertains more especially to the structure of an anode for such a tube.

The continuous operation of a vacuum power tube on a high frequency, high voltage circuit results in the generation within the tube of a considerable amount of heat. This heat tends to increase the temperature of the anode and will finally render the tube inoperative. It is an object of this invention to provide an anode which functions satisfactorily with respect to the other electrodes of the tube and which may be maintained at the proper temperature to insure maximum efficiency of the tube even though it be used in high frequency, high voltage circuits.

To accomplish the object of this invention and to improve generally upon vacuum tubes, the anode comprises a thin walled vessel which is adapted to contain a cooling fluid. This fluid is caused to flow through the anode and carry away from the walls thereof sufficient heat to maintain the anode at the proper temperature.

Figure 1:
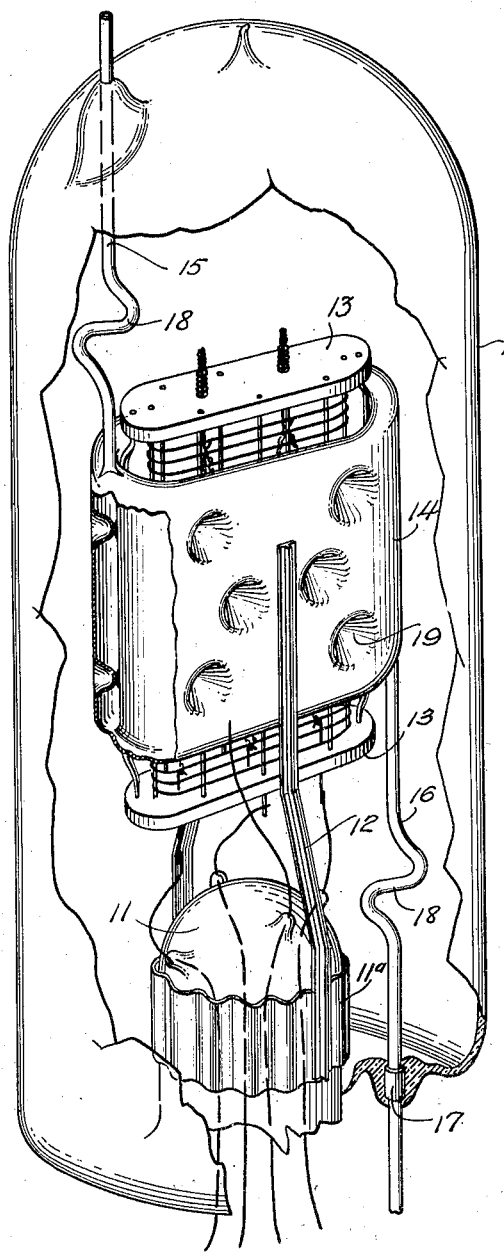
Figure 3:
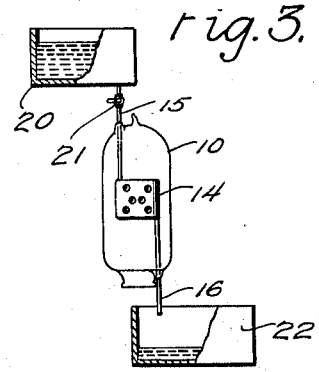
Figure 2:
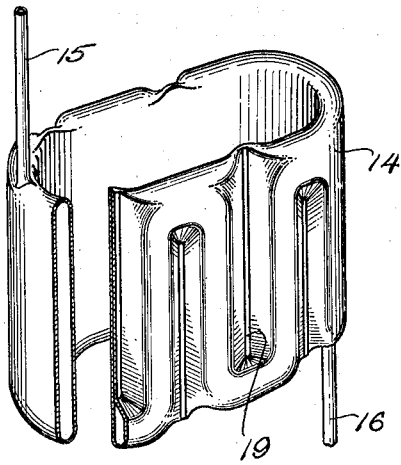

This invention will be better understood by reference to the following specification and the accompanying drawings wherein Figure 1 discloses a vacuum tube having an anode constructed in accordance with the invention, Figure 2, shows a modified form of anode and Figure 3 discloses a somewhat diagrammatic view of the operation thereof.

The vacuum tube comprises the usual bulb 10 and the stem 11, encircling which stem is the collar 11ª from which the supports 12 extend toward the center of the bulb. Mounted on the supports 12 is the anode 14 to which are attached the blocks 13 of insulating material, between which are supported the grid and cathode.

The anode comprises a somewhat flattened tubular double walled closed vessel which encircles the grid and cathode. This vessel is formed from very thin metal and the parallel walls thereof are placed closely adjacent each other so that the vertical surfaces are of the maximum size possible for the area of the vessel. At substantially opposite points on the anode are provided the conduits 15 and 16 which extend through the wall of the bulb 10, there being provided on each conduit a platinum thimble 17 which is sealed into the glass of the bulb to make a gas tight joint. Each of the conduits 15 and 16 is crooked as at 18 to provide for extension and contraction of the conduits without disturbing the seal in the wall of the bulb. The conduit 15 is adapted to be connected to a source of supply of cooling fluid and the conduit 16 is arranged to lead off the fluid from the anode.

The pressure of the cooling fluid within the anode tends to distort it and to separate the thin walls thereof from each other, this effect being increased because of the evacuated condition of the bulb. In order to maintain the walls in their desired close relation depressions 19 are formed in one or both of the walls and the bottoms of these depressions are brought into contact with the opposite wall and are joined thereto preferably by spot welding. This arrangement gives to the walls of the anode the necessary bracing to retain them in their closely spaced relation against the pressure exerted by the cooling fluid flowing therebetween. Furthermore, the arrangement of depressions throughout the vessel forces the fluid to travel over a tortuous path whereby in its flow through the anode all the fluid is brought into contact with all the interior surface of the anode.

In Figure 2 the depressions 19 extend alternately from the top and bottom edges of one of the vertical walls of the anode to a point near the opposite edge. The bottoms of these depressions are in contact with the opposite wall and are joined thereto throughout their length. This alternate arrangement of the depressions forms a continuous tortuous passage through the anode from the entrance conduit 15 to the exit conduit 16.

In the use of this device as disclosed in Figure 3, the entrance conduit 15 is connected with a source of supply 20 of cooling fluid which is allowed to pass through the anode and out through exit conduit 16 into a tank 22. The rate of flow of the fluid through the anode may be controlled by any desired valve 21 so that heat is conducted away from the anode at a rate to maintain it at the proper temperature to operate at its highest efficiency. It is, of course, understood that the cooling fluid may after its passage through the anode be itself cooled and then returned to the source of supply 20.

What is claimed is:

1. An anode for vacuum tubes comprising a closed vessel having thin parallel side walls closely adjacent each other, depressions in one of said walls, the bottoms of said depressions being in contact with and attached to the opposite wall, said depressions being so arranged as to form a tortuous path through said vessel, and ports in said vessel whereby a cooling fluid may be passed therethrough along said tortuous path.

2. An anode for vacuum tubes comprising a closed vessel having thin parallel side walls closely adjacent each other, depressions in one of said walls extending alternately from each edge thereof toward the opposite edge, the bottoms of said depressions being in contact with and attached to the opposite wall whereby a tortuous path is formed from said vessel, and ports in said vessel whereby a cooling fluid may be passed therethrough along said tortuous path.

3. In a vacuum tube a hollow anode having thin parallel side walls closely adjacent each other, depressions in one of said walls, the bottoms of said depressions being in contact with and attached to the opposite wall, said depressions being so arranged as to form a tortuous path through said anode, and conduits in communication with said anode whereby a cooling fluid may be passed through said anode, said conduits extending through and being sealed into the wall of the tube.

4. In a vacuum tube, a hollow anode having thin parallel side walls closely adjacent each other, depressions in one of said walls extending alternately from each edge thereof toward the opposite edge, the bottoms of said depressions being in contact with and attached to the opposite wall, whereby a tortuous path is formed through said anode, and conduits in communication with said anode whereby a cooling fluid may be passed therethrough, said conduits extending through and being sealed into the wall of the tube.

5. In a vacuum tube, a grid, a cathode and a substantially cylindrical anode surrounding said grid and cathode, said anode comprising a closed vessel having parallel walls closely adjacent each other, depressions extending alternately from each edge of one of said walls nearly to the opposite edge thereof, the bottoms of said depressions being in contact with and joined to the opposite wall for maintaining said walls in fixed relation whereby a tortuous path is formed through said anode, and means to pass a cooling fluid along said path.

In witness whereof, I hereunto subscribe my name this 17th day of November A. D., 1920.

ALLEN H. HOPPOCK.